United States Patent [19]

Tilton

[11] 4,356,748
[45] Nov. 2, 1982

[54] SAW GUIDE

[76] Inventor: Charles W. Tilton, 2655 Middlefield Rd., Redwood City, Calif. 94063

[21] Appl. No.: 193,367

[22] Filed: Oct. 2, 1980

[51] Int. Cl.³ .............................................. B27B 9/04
[52] U.S. Cl. ........................................ 83/745; 83/522
[58] Field of Search .................................. 83/743–745, 83/522; 30/376; 33/174 G, 403, 430, 443, 447, 482, 483

[56] References Cited

U.S. PATENT DOCUMENTS

| | | | |
|---|---|---|---|
| 2,002,676 | 5/1935 | Owens | 33/446 |
| 2,956,598 | 10/1960 | Johnson | 83/745 |
| 3,011,530 | 12/1961 | Lamb | 83/745 |
| 3,085,343 | 4/1963 | Skripsky | 33/446 |
| 3,586,077 | 6/1971 | Pease | 30/376 |
| 3,983,776 | 10/1976 | Flanders | 83/745 |
| 4,059,038 | 11/1977 | Rietema | 83/745 |
| 4,065,114 | 12/1977 | Pennington | 83/745 X |
| 4,080,742 | 3/1978 | Osterried | 33/174 G |
| 4,179,965 | 12/1979 | Johnson | 83/745 |
| 4,244,118 | 1/1981 | Matusak | 83/745 X |

Primary Examiner—James M. Meister

Attorney, Agent, or Firm—Donald C. Feix

[57] ABSTRACT

An adjustable saw guide for hand-held power saws facilitates a straight-line cut. The guide is adjustable for any width of portable power saw by adjustment and locking of an elongated saw guide member in the proper position on the surface of a saw table slide member which serves as a base of the apparatus.

A hand-held power saw rests and slides on the saw table slide member while engaging against the guide member to assure a straight cut.

In proper adjustment of the saw guide member for the particular saw being used, the saw (when against the saw guide member) will have its blade just outside and very close to the edge of the saw table slide. This minimizes fraying of the upper surface of the workpiece where the sawblade teeth move upwardly through the surface in cutting.

The saw guide apparatus is attached directly to the workpiece by clamps which are adjustable by sliding along a bar. The apparatus may be extended for long or wide workpieces by securing it to another similar apparatus.

7 Claims, 7 Drawing Figures

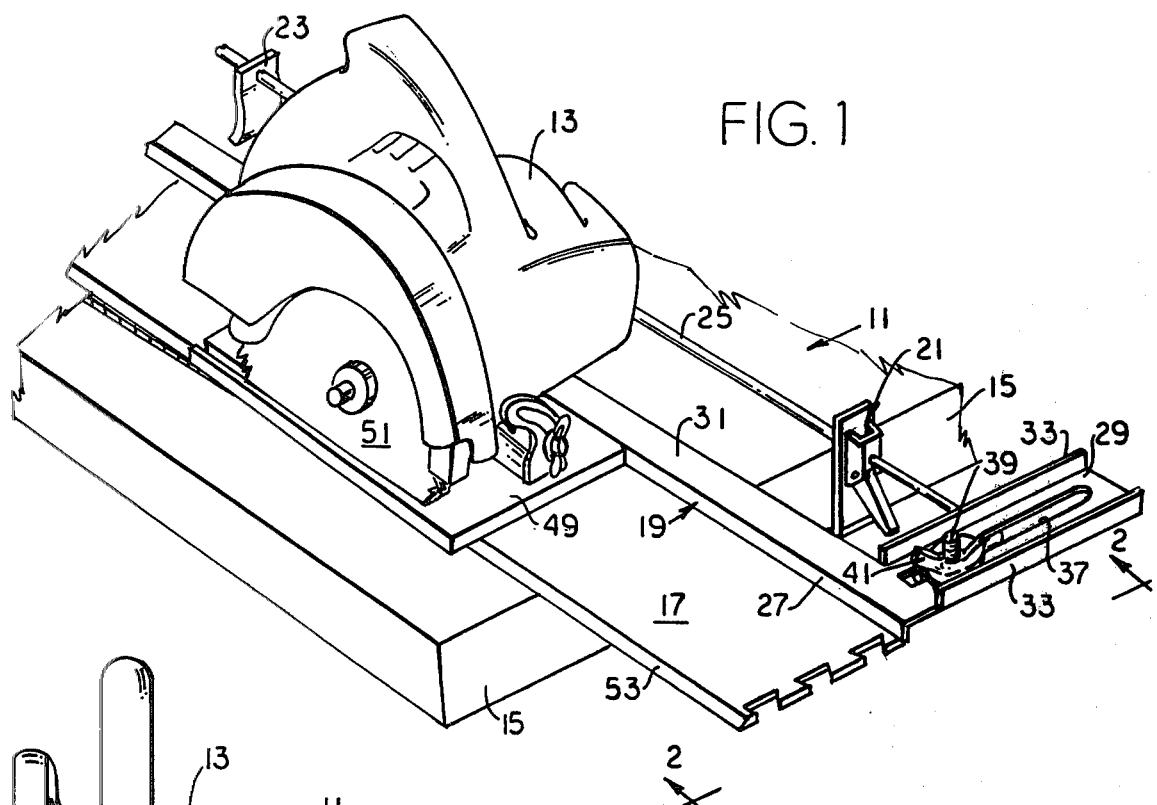
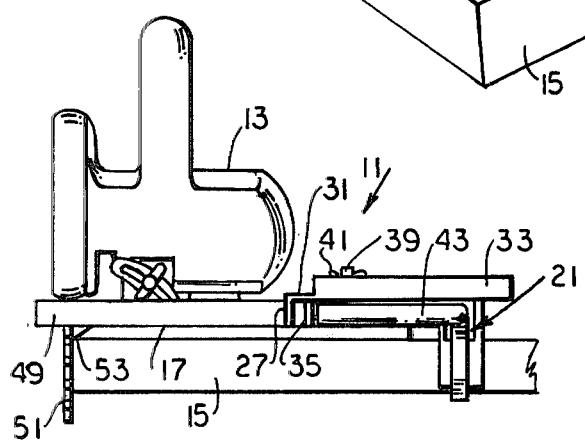
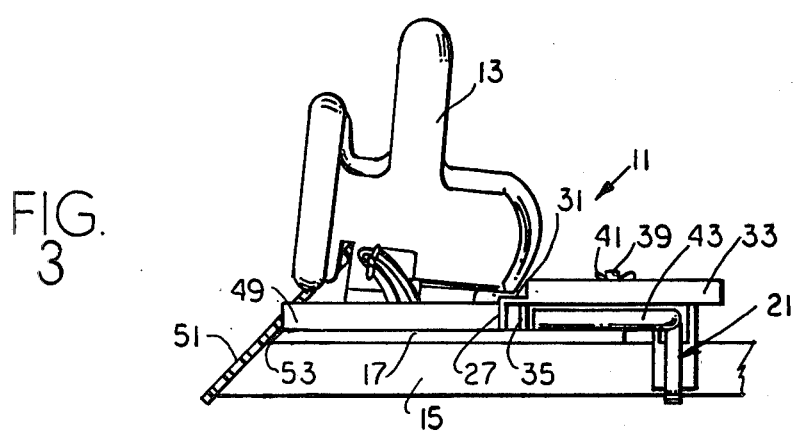

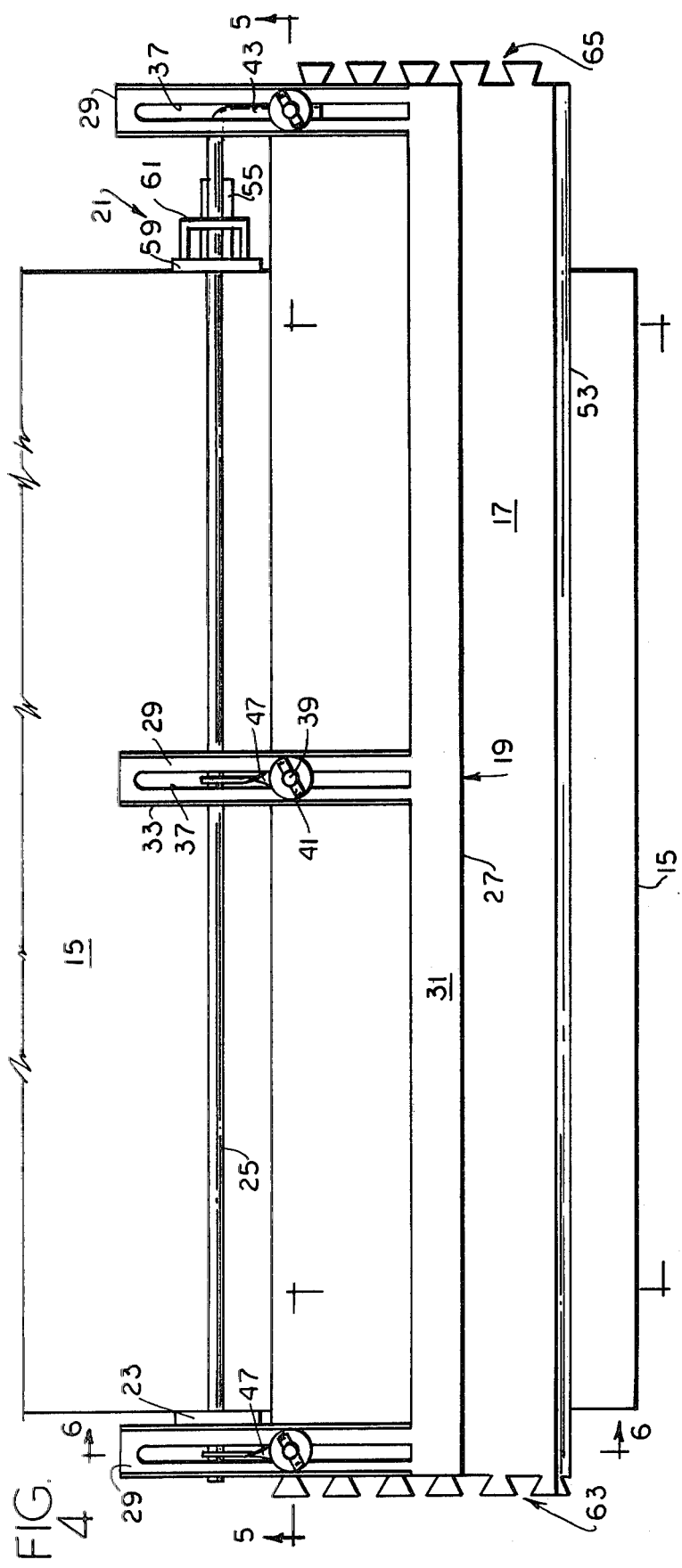
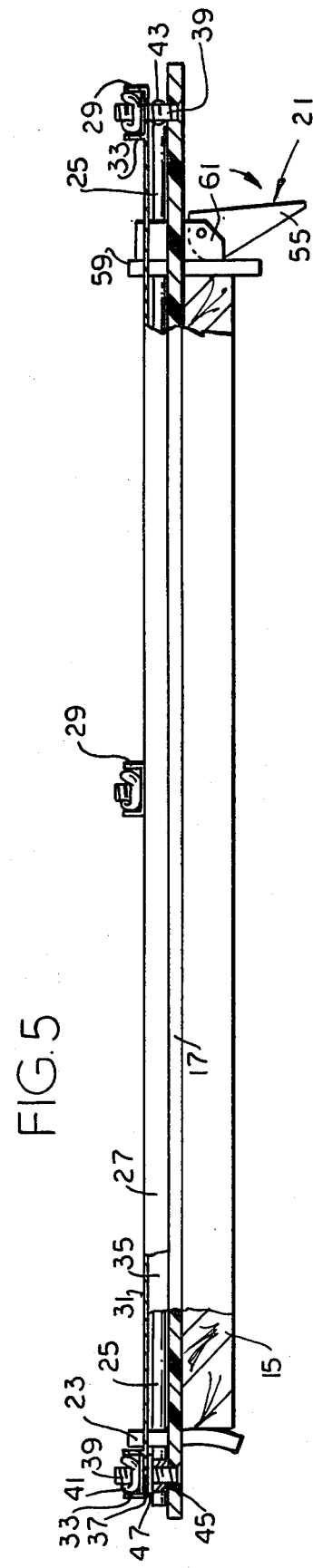

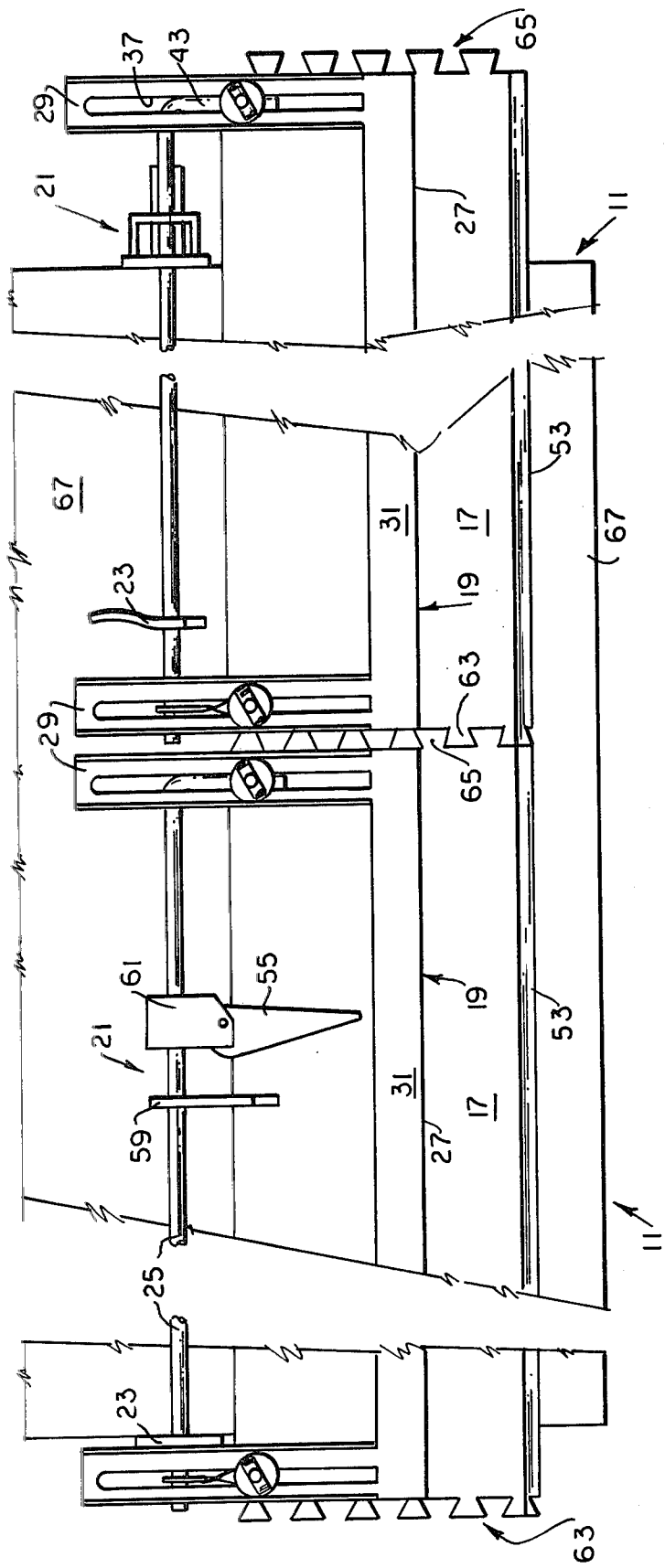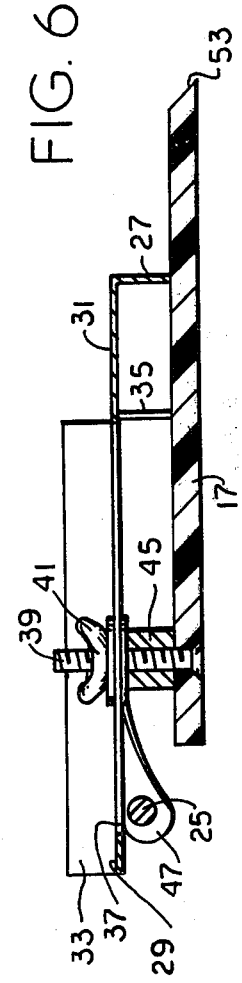

SAW GUIDE

BACKGROUND OF THE INVENTION

The invention relates to carpentry tools and in particular to a portable, adjustable guide tool for assuring a straight cut with a portable power saw.

Portable hand-held power saws, particularly circular-blade saws, are not easily guided in a straight path except by experienced carpenters. Even then, a perfectly straight cut cannot be achieved with strictly freehand motion.

Various types of guides or jigs for portable power saws have been proposed in order to guide a hand-held saw in a straight cutting path through a panel of wood or other material. See, for examle, U.S. Pat. Nos. 2,677,399; 2,735,455; 2,735,456; and 3,124,176. However, guides such as these have generally involved elaborate clamping devices for gripping the panel to be cut, have required large tables for holding the panel, or have been cumbersome in setting the guiding straightedge at the correct location for making the cut. In some prior art saw guides, the portable saw had to be attached to a slidable component of the guide, and this was also time consuming and cumbersome.

Some of the objects of the present invention are to improve the manner in which such a saw guide tool is retained stationary with respect to the panel to be cut, to make the saw guide lightweight and easily portable, to facilitate adjustment of the tool for different widths of hand-held power saws, and to provide for quick set up of the tool. Additional objects are to enable the tool to be used with a variety of different widths or lengths of panels and to minimize fraying at the surface of the panel, where the sawblade teeth move upwardly through the surface in cutting.

SUMMARY OF THE PRESENT INVENTION

The adjustble saw guide tool of the present invention has a base or saw table slide member which is placed across the surface of the panel to be cut. A pair of adjustable clamps on a bar secured to the saw table slide engage the edges of the panel and hold the saw table slide fixed relative to the panel. An adjustable saw guide member having a straight forward edge is mounted on the saw table slide, parallel to a forward edge of the saw table slide, and acts as a guiding edge for movement of a hand-held power saw placed on the saw table slide. Different widths of power saws are accommodated by adjustment of the guide's position to the appropriate spacing between the forward edges of the guide and of the saw table slide.

In a specific embodiment the saw guide tool of the invention includes means for connecting two or more tools together to accommodate wider or longer workpieces. This may be accomplished through the use of dovetailing at the ends of the saw table slide members to firmly interlock the members together as sections. The adjustable clamps are still used as in a single section, but intermediate clamps are inactive, with only the end ones engaging the edges of the workpiece.

The saw guide tool of the invention is compact and light in weight. The manner of holding it to the workpiece and the way in which the saw guide member is adjusted and set enable quick set up of the tool and movement between successive cutting locations.

In one embodiment of the invention, an adjustable saw guide tool for hand-held power saws comprises a flat saw table slide member, serving as a base and having a straight, elongated edge, with an adjustable, elongated saw guide member positioned on the saw table slide member. The saw guide member has a straight edge spaced from the saw table slide member. Means are included for locking the saw guide member a selectable distance from the edge of the saw table slide member, parallel to the saw table slide member, for receiving a hand-held power saw having a base plate engaged against the saw guide member and a blade positioned outside and closely adjacent to the edge of the saw table slide member. The saw table slide member is held to the workpiece to be cut by an adjustable securing means, with the straight edge of the saw table slide member adjacent and parallel to the desired line of cut on the workpiece.

An adjustable saw guide tool which incorporates the structures and techniques described above and which is effective to function as described above, constitutes a further, specific object of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a frontal perspective view of an adjustble saw guide tool in accordance with one embodiment of the invention, shown with a portable power saw positioned for use on the tool for cutting a panel.

FIG. 2 is an end view of the saw guide tool showing the saw and the panel being cut, taken along the line and in the direction indicated by the arrows 2—2 in FIG. 1.

FIG. 3 is an end view similar to that of FIG. 2, but showing the saw making an angled or bevel cut in the panel.

FIG. 4 is a plan view of the saw guide tool, shown secured to the panel to be cut.

FIG. 5 is a sectional view of the saw guide tool, taken along the line and in the direction indicated by the arrows 5—5 in FIG. 4 and showing the manner in which clamping members on the tool engage edges of the panel to secure the tool to the panel.

FIG. 6 is a sectional view taken along the line and in the direction indicated by the arrows 6—6 in FIG. 4, showing an adjustable saw guide member and the structure by which it is adjusted and locked on a saw table slide or base member.

FIG. 7 is a plan view similar to FIG. 4, but showing two similar saw guide tools connected together end-to-end to accommodate a panel wider than can be engaged by a single saw guide tool.

DETAILED DESCRIPTION OF PREFERRED EMBODIMENTS

An adjustable saw guide tool constructed in accordance with one embodiment of the present invention is indicated generally by the reference numeral 11 in FIG. 1, shown in position to guide a hand-held power saw 13 in cutting off a workpiece 15, which may be a panel of wood, for example. Although a circular saw 13 is shown in FIG. 1, other hand-held power saws (including reciprocating saws, such as sabre saws) may be used on the portable saw guide tool 11.

The saw guide tool 11 includes a flat saw table slide or base member 17, an adjustable saw guide member 19 positioned on the member 17, and two clamping members 21 and 23 on a bar 25 for clamping the panel 15 by its edges.

The saw table slide or base member 17, as best seen in FIGS. 1, 2 and 4, may be a generally rectangular piece of wood, plastic, aluminum, or other rigid material.

The saw guide 19 preferably is of stamped metal, of one-piece construction as indicated in the drawings. It includes a front guiding edge 27 and two or more flanges 29 extending rearwardly for locking the saw guide 19 in the desired position on the base or saw table slide 17. In the specific embodiment illustrated in FIGS. 4 and 5, three flanges 29 are included.

A preferred specific construction of the adjustable saw guide member 19 is shown in FIGS. 1, 2 and 5. In this construction, a single flat metal piece is cut and bent into the illustrated shape, with the guiding edge 27 extending down from a flat strip 31 from which the locking flanges 29 extend flushly. The locking flanges may have stiffener lips 33 bent upwardly. A lip 35 also hangs down from the rear side of the strip 31, both the lip 35 and the guiding edge 27 resting on the base 17. In each locking flange 29, an elongated slot 37 is positioned to permit forward and rearward adjustment of the saw guide member 19 with respect to the base or saw table slide member 17.

For locking the saw guide member 19 in position, easily releasable fasteners such as bolts 39 with wingnuts 41 extend up from the base 17 and through the slots 37. This is best seen in FIGS. 2 and 6. Since the slotted flanges 29 do not lie directly on the base 17, spacers are included along the bolts 39 between the base 17 and the flanges 29. This may comprise, at the end shown in FIG. 1, a right-angled leg 43 of the bar or track 25 on which the clamping members 21 and 23 are mounted. The bolt 39 may pass through this portion of the bar, as seen in FIGS. 1, 2, 4 and 5, and this is effective to anchor the bar 25 to the base 17 at this end.

At the locations of the other flanges 29, the spacer may comprise (see Fig. 6) a nut 45 and the thickness of a bar retaining bracket 47 wich is twisted from a horizontal plane at the bolt 39 to a vertical plane where the bar 25 passes through it. In this way, the bar 24 is retained in place by the same structure that locks the saw guide 17 in position and enables adjustment of the position.

FIG. 1 shows the saw guide tool 11 adjusted for use with a particular hand-held power saw 13. The saw guide member 19 is properly positioned so that when a base plate 49 of the saw 13 is held against the guiding edge 27, the saw's blade 51 extends just over and closely adjacent to a forward edge 53 of the base or saw table slide 17. This helps avoid fraying of the upper surface of the panel 15 being cut, while also maximizing the surface width on which the saw base 49 slides.

The forward edge 53 of the base 17 is beveled in the specific embodiment shown, in order to accommodate angled or bevel cuts as well as perpendicular cuts, while still keeping the blade very close to the edge 53 where it meets the panel 15. FIG. 3 shows the saw 13 tilted on its base 49 for an angled cut. The angle of the edge 53 may be 45°, assuring that the blade can be close to the edge in cuts of 90° (FIG. 1) down to 45°.

For most saws, the position of the saw guide member 19 will have to be adjusted for different cutting angles, in order to keep the blade close to the edge 53.

To adjust and set the saw guide member 19 for a particular hand-held power saw, several different procedures may be used. With the wingnuts 41 loosened the saw, such as the saw 13, may be placed on the base or saw table slide with the blade closely adjacent to the forward edge 53. This may be done with the base lying on a table, for example, and slightly overhanging the table's edge. Then the saw guide 19 may be brought up to and into contact with the saw's base plate 49. With the front guiding edge 27 of the saw guide parallel to the forward edge 53 of the base 17, the wingnuts 41 can be tightened to lock the saw guide in position.

Another and sometimes easier way of making the adjustment is to first lay the saw 13 on a table or workbench such that the blade closely overhangs the table's edge. The edge of the saw's base plate can be used to mark the table, preferably in two places, to represent the desired distance between the front edges 27 and 53 of the saw guide and the base. Then the saw guide tool is inverted and placed on the table with the wingnuts 41 loosened, such that the front edge 53 of the base 17 just meets the marks on the table or workbench. With the base 17 in the position, the saw guide 19 is brought up to the table's edge and the wingnuts 41 are tightened.

The clamping members 21 and 23 and the manner in which they operate to hold the saw guide tool 11 on the workpiece panel 15 are illustrated in FIGS. 4 and 5. Both clamping members 21 and 23, when engaged against the panel 15, grip the bar 25 by friction. Openings through the clamps become canted on the bar when pressure is applied on a cam lever 55, thus gripping the bar and preventing sliding of the clamps on the bar.

The clamping member 23 is simply a stop against which one end of the workpiece is held while clamping force is applied by the other clamping member 21. The member 23, best seen in FIG. 5, is curved generally as shown so that the edge of the workpiece panel 15 pushes on an outwardly bulging portion 57. This causes the member 23 to tilt or cant on the bar 25 so that the member grips the bar.

The other clamping member 21 includes two parts: a plate 59 for positioning against the panel 15 and a cam clamping device 61 including the cam lever 55. When the cam lever 55 is rotated as indicated in the drawing it pushes against the plate 59, which pushes against the panel 15. This causes the clamping device 61 to tilt and lock in position on the bar 25, while the cam lever 55 increases the clamping force on the panel.

The clamping members 21 and 23 freely slide on the bar 25 when not clamped against a panel, and are readily adjusted to engage any width of panel within the width limitation of the bar 25. They enable quick and easy locking of the tool 11 and the panel 15 together.

When the saw guide tool 11 has been set up for the particular saw to be used, it is placed on the panel 15 so that the forward edge 53 is alongside the line or marking on the panel where the cut is to be made. The clamping members 23 and 21 are positioned and clamped onto the panel's edges. The saw guide tool 11 is then ready for use with the saw 13 to cut off the panel in a straight line as desired.

If the panel to be cut is wider (or longer, if a lengthwise cut is to be made) than the maximum spacing between the clamping members 21 and 23, the specific embodiment illustrated enables two or more similar saw guide tools 11 to be connected together to engage the larger panel.

Two saw guide tools 11 of the present invention are shown connected together in FIG. 7, by ends of the base members 17. It is important that the front edges 53 of the two tools be in registry, and for this purpose interlocking dovetail ends 63 and 65 on each base member 17 provide a rigid connection which assures proper registration of the front edges. Other suitable edge connecting arrangements may be used, but the dovetail interlock is simple and inexpensive to form, integral with the base 17, and easily connected and disconnected.

In use of the multiple saw guide tool shown in FIG. 7, it is important that the two adjustable saw guides 19 be in accurate registry. They may each be adjusted as described above for the particular saw being used, or one can be set and the other made to match by using measurements or a straightedge across the two front guiding edges 27. If desired, the two guides 19 may be connected together at the adjacent central flanges 29, by appropriate, coveniently used connection means (not shown).

To attach the multiple saw guide tool of FIG. 7 to a wide panel 67 to be cut, the two intermediate clamping members 21 and 23 are swung around as shown so that they do not interfere with the panel. The two end clamping members 21 and 23, one from each tool 11, are used to engage the wide panel 67. The clamping force is transmitted indirectly between the clamping members 21 and 23, through the bar 25 and the base 17 of the tool section shown on the right in FIG. 7, into the base section on the left and through the length of that bar 25 to the clamp 23.

More than two saw guide tools 11 may be connected together if necessary for sawing very wide or long panels. The dovetail end connections make this easy and convenient, with the multiplicity sections readily dismantable after the saw cut is made.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An adjustable saw guide tool for hand-held power saws, comprising
saw table slide member means having an upper surface for supporting the base plate of the power saw as the power saw base plate slides along the upper surface of the saw table slide member means in the course of making a cut on the workpiece,
said saw table slide member means having
a flat lower surface engagable directly with and supported on the upper surface of the workpiece and
a side surface having a lower cut indicating edge engagable directly with the upper surface of the workpiece for indicating the line to be cut without any lateral offset of the kind which could arise if the cut indicating edge were spaced from the surface of the workpiece,
said guide member means having a guide edge for engaging a related side edge of the base plate of the power saw to guide the power saw as the base plate slides along the upper surface of the saw table slide member means in the course of making a cut on the workpiece,
locking means for locking the saw guide member means to the saw table slide member means,
said locking means including lateral adjustment means for permitting the lateral position of the guide edge to be adjusted with respect to the cut indicating edge prior to locking the saw guide member means to the saw table slide member means for accommodating different types of power saws having different widths of base plates in a way such that the guide edge acting on the saw base plate positions the saw blade substantially immediately adjacent the cut indicating edge, and
clamping means for clamping the saw guide tool to the work piece by engaging the edges of the workpiece.

2. The invention of claim 1 wherein the clamping means comprises two opposed clamping members and an elongated track means, the two clamping members being mounted on the track means for adjustable longitudinal movement and being positioned to engage against opposed edges of the workpiece to clamp it between them.

3. The invention of claim 2 wherein each clamping member has an opening through which the track means passes, and including means associated with the clamping member and the track means for gripping the track means by friction when the clamping member is engaged against the workpiece.

4. The invention of claim 3 wherein one clamping member has a rotatable cam lock for tightening the two clamping members against the edges of the workpiece.

5. The invention of claim 3 wherein the track means is a smooth bar of constant cross section, and the means for gripping includes means for tilting the clamping members obliquely with respect to the bar when they are engaged against the edges of the workpiece so that the openings in the clamping members are canted and frictionally bind against the bar.

6. The invention of claim 5 wherein one clamping member has a rotatable cam lock for tightening the two clamping members against the edges of the workpiece and increasing the cant of the clamping members on the bar, thereby causing the frictional engagement of the clamping member to increase with increased tightening of the cam lock.

7. The invention of claim 1 wherein the locking means comprise a pair of adjustment brackets extending generally perpendicularly from the saw guide member means, one at each end, lying generally parallel to the plane of the saw table slide member means, with an elongated slot in each adjustment bracket and threaded fastener means extending up from the saw table slide means through each slot for tightening the brackets down against the saw table slide means in the desired position of the saw guide member means.

* * * * *